United States Patent [19]

Garrett

[11] 4,156,650
[45] May 29, 1979

[54] TREATMENT OF LIQUIDS
[75] Inventor: Michael E. Garrett, Woking, England
[73] Assignee: BOC Limited, London, England
[21] Appl. No.: 798,488
[22] Filed: May 19, 1977
[30] Foreign Application Priority Data
May 20, 1976 [GB] United Kingdom ............... 20928/76
[51] Int. Cl.² ............................................... C02B 1/34
[52] U.S. Cl. ................................... 210/63 R; 210/139; 210/194; 261/81
[58] Field of Search ................... 210/14, 15, 19, 63 R, 210/194, 220, 139; 136; 261/81, 82

[56] References Cited
U.S. PATENT DOCUMENTS
3,734,850  5/1973  Karr ...................................... 210/194
3,785,490  1/1974  Ryan et al. ............................ 210/44
4,045,336  8/1977  Isteri ..................................... 210/19

Primary Examiner—Thomas G. Wyse
Attorney, Agent, or Firm—Dennison, Dennison, Meserole & Pollack

[57] ABSTRACT

A method for treating a body of liquid with a gas, which method comprises passing a stream of the liquid through a conduit, injecting gas intermittently into the stream at high pressure so as to dissolve at least some of the gas in the liquid stream, and introducing the stream containing dissolved gas and undissolved bubbles of gas into the main body of liquid under turbulent conditions such that the undissolved bubbles are shattered into even finer bubbles which dissolve in, or are consumed within, the main body of liquid.

9 Claims, 1 Drawing Figure

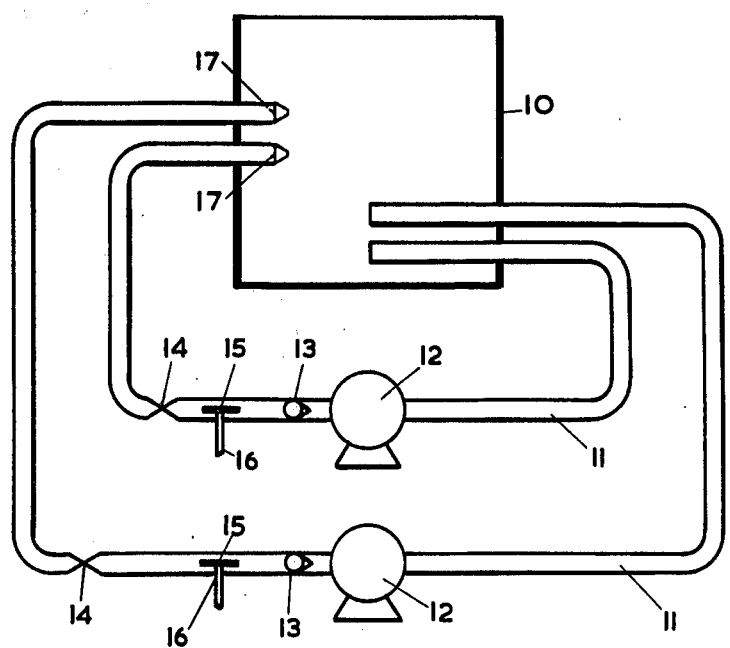

TREATMENT OF LIQUIDS

This invention relates to a method and apparatus for treating liquid by dissolving gas therein, and particularly, but not exclusively, to treating aqueous material, which may or may not contain biochemically oxidizable material, with a gas rich in oxygen.

It has been proposed to treat a body of liquid by introducing into the body a pressurised stream of liquid containing a treatment gas in the form of dissolved gas and bubbles of undissolved gas. The stream is introduced into the main body of liquid under turbulent conditions such that the bubbles of undissolved gas are shattered into even finer bubbles which dissolve in, or are consumed within, the main body of liquid. The pressure of the gas introduced continuously into the stream of liquid is limited to a value which will not appreciably disturb or reduce the flow of the stream of liquid throuh a conduit through which it is introduced into the main body of the liquid. However, owing to the necessarily relatively low pressure of the gas, the rate of dissolution of the gas is correspondingly low, unless the pressure of the stream in the conduit is increased allowing a higher gas pressure to be used successfully which requires a corresponding increase in the power consumption.

The invention provides a method for treating a body of liquid with a gas, which method comprises passing a stream of the liquid through a conduit, injecting gas intermittently into the stream at high pressure, e.g. above 50 psig, so as to dissolve at least some of the gas in the liquid stream, and introducing the stream containing dissolved gas and undissolved bubbles of gas into the main body of liquid under turbulent conditions such that the undissolved bubbles are shattered into even finer bubbles which dissolve in, or are consumed within, the main body of liquid.

The invention also provides apparatus for treating a body of liquid with a gas, which apparatus comprises a conduit through which a stream of the liquid can be passed, in use, into a main body of liquid, means adapted to inject intermittently at high pressure bubbles of gas into a stream of liquid, in use, passing through the conduit, and means for introducing under turbulent conditions a stream of liquid containing dissolved gas and undissolved bubbles of gas from the conduit into a main body of liquid.

When the conduit is of a sufficient length, pulses of gas of a relatively short duration, e.g. 0.1 second, are introduced into a continuous flow of liquid through the conduit. In this way, the high pressure of each pulse of gas, for example in the range 50 to 250 psig, typically 150 psig, permits a high and rapid degree of dissolution of such gas in the liquid without restricting substantially the liquid flow. For example 40 to 100 ppm of an oxygen rich gas can in this way be dissolved in an aqueous stream namely about 10% of the equilibrium saturation value at that pressure. The gas bubbles introduced into the liquid during each pulse, e.g. through a diffuser, reduce in size as the gas dissolves in the liquid, and the resulting smaller diameter bubbles and any gas which comes out of solution as the pressure of the stream drops can dissolve in the parts of the stream flowing through the conduit into which gas is not injected, or are dissolved in, or consumed within, the main body of liquid.

The term "oxygen rich gas" is used herein to mean oxygen, or a gas having a high proportion of oxygen than that of air.

In other methods and apparatus according to the invention, particularly when a relatively short conduit is used, individual slugs of liquid may be isolated in a region of the conduit and bubbles of gas pulsed into each isolated slug of liquid at high pressure. After the gas pulse, the slug of liquid containing dissolved gas and undissolved bubbles of gas is released into the main body of liquid under turbulent conditions. Valves may be used to control flow through the conduit, one valve on each side of the gas injector whereby slugs of liquid may be isolated as aforesaid when the valves are closed. The valves are preferably automatically controlled to open and close in a timed sequence and such control preferably includes intermittent operation of means for injecting gas under high pressure. It is also possible to use a control valve downstream of the gas injector and a non-return valve upstream of the injector as a means of isolating slugs of liquid. In this way gas under high pressure can be pulsed into a trapped portion of liquid to dissolve rapidly a proportion of such gas in the liquid. On release of the slug, undissolved gas can dissolve in the portions of the liquid not isolated for gas injection therein. In such embodiments two or more conduits and gas injection means may be provided with the gas pulses for each conduit out of phase so that an output of liquid into the main body of liquid from one or other conduit takes place at any one time.

The stream of liquid is preferably withdrawn from the main body of liquid and fed through the aforesaid conduit.

A method and apparatus can be used for dissolving many different types of gas in various liquids as required. It is particularly suitable for dissolving an oxygen-rich gas in aqueous waste material but is also applicable, for example, to dissolving a wide variety of other gases in other liquids.

A method and apparatus according to the invention will now be described by way of example and with reference to the accompanying drawing which is a diagrammatic representation of an apparatus for dissolving as in liquid embodying the invention.

Referring to the drawing, a main body of liquid, for example aqueous waste material, is contained in an open topped tank 10. Two streams of the liquid are withdrawn each through a respective conduit 11 by a pump 12. In each conduit there is a non-return valve 13 and a solenoid operated control valve 14 located so that a slug of waste material can be trapped in the conduit between the valves when the valve 14 is closed. A typical length of conduit between the valves 13 and 14 is of the order of 1 meter.

A gas diffuser 15 is located in each conduit between the valves 13 and 14. The diffuser 15 comprises a hollow small bore, e.g. 15 mm diameter, length of gas permeable material, for example a sintered material or a unglazed porcelain, located at the bottom of conduit to release bubbles of gas which rise through the liquid in the conduit. A gas line 16 is connected to each diffuser and supplied with gas at high pressure from a source (not shown).

In use, the valve 14 is closed in a controlled-timed sequence to trap slugs of liquid. A pulse of gas at high pressure, e.g. 300 psig, is released into each slug. The pulse lasts for a relatively short period, e.g. 1 second. As the gas bubbles are released from the diffuser they rise upwardly and reduce in size as the gas dissolves. The high pressure of the gas allows a high and rapid dissolution of such gas, e.g. 40 to 100 ppm. When the valve 14 is then opened to release the slug, the relatively small remaining bubbles of undissolved gas dissolve in the waste material in which gas is not injected, or is carried under turbulent conditions into the main body of liquid through a jet 17 such that the bubbles are shattered into minute bubbles which dissolve in, or are consumed within, the main body of liquid. A control system may be used to control automatically opening and closing of valve 14 and the injection of the gas pulses in a predetermined timed cycle to achieve the introduction of the required amount of gas. The gas pulses in each conduit are out of phase with one another such that there is delivery of liquid containing dissolved, and undissolved bubbles of, gas from one or other conduit at any one time.

The invention has as its object the dissolution of gas under high pressure in a liquid.

What I claim is:

1. A method for treating a body of liquid with a gas, which method comprises the sequential steps of: withdrawing a stream of the liquid from the body of liquid and pumping it through a conduit, isolating individual slugs of the liquid in a region of the conduit, pulsing bubbles of gas at a pressure above about 50 psig for a relatively short period into the isolated slugs of liquid of the stream so as to dissolve at least some of the gas in the liquid stream, and introducing the stream containing dissolved gas and undissolved bubbles of gas into the main body of liquid under turbulent conditions such that the undissolved bubbles are shattered into even finer bubbles which dissolve in, or are consumed within, the main body of liquid.

2. A method as claimed in claim 1 wherein each pulse lasts substantially 0.1 second.

3. A method as claimed in claim 1 wherein the pressure of each pulse of gas is in the range 50 to 250 psig.

4. A method claimed in claim 3 wherein said pressure is 150 psig.

5. Apparatus for treating a body of liquid with a gas, which apparatus comprises a conduit through which a stream of the liquid can be withdrawn and recycled into a main body of liquid, automatic means for isolating individual slugs of liquid in a region of the conduit by valve means including at least two valves, said valve means including automatic means to open and close at least one valve of said valve means by timed sequence means, means adapted for pulsed injection of bubbles of the gas for a relatively short period into timed sequence isolated slugs of liquid of a stream of liquid to be passed through the conduit, and means for introducing under turbulent conditions a stream of liquid containing dissolved gas and undissolved bubbles of gas from the conduit back into a main body of liquid.

6. Apparatus as claimed in claim 5 wherein said at least two valves are used in said automatic means to control flow through the conduit, one valve on each side of the gas injector whereby slugs of liquid may be isolated as aforesaid when the valves are closed.

7. Apparatus as claimed in claim 6 wherein the valves are automatically controlled to open and close in a timed sequence and such control includes intermittent operation of means for injecting gas under high pressure.

8. Apparatus as claimed in claim 6 wherein there is provided a control valve downstream of the gas injector and a non-return valve upstream of the injector as a means of isolating slugs of liquid.

9. Apparatus as claimed in claim 5 wherein two or more conduits and gas injection means are provided with the gas pulses for each conduit out of phase so that an output of liquid into the main body of liquid from one or another conduit takes place at any one time.

* * * * *